Patented July 29, 1941

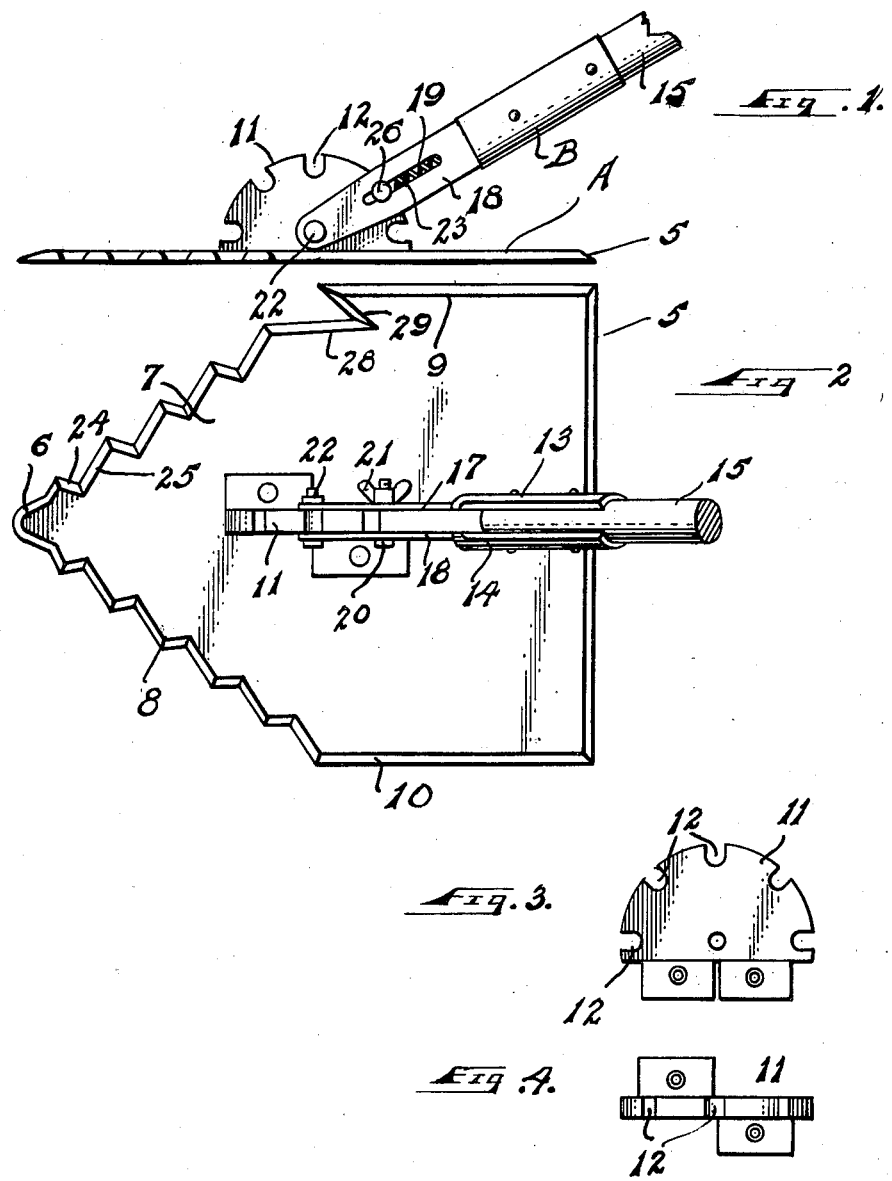

2,251,048

UNITED STATES PATENT OFFICE 2,251,048

GARDEN TOOL

Joseph F. Garland, Salt Lake City, Utah

Application October 10, 1940, Serial No. 360,625

1 Claim. (Cl. 97—68)

My invention relates to garden tools and more particularly to those types of tools used as hoes and weeders and has for its object to provide a new and highly efficient hoe which is easily and quickly adjusted to any angle desired.

A further object is to provide a garden hoe which has a rack formed on the top side thereof to which an adjustable handle is pivotally attached with the handle carrying a means to lock the handle in any predetermined position in the rack to lock the handle while in use.

A further object is to provide a utility garden tool or hoe which may be used as a scuffle hoe, or a drag hoe, as a shovel or spade, a weed cutter, sod cutter, and pruner, trimmer for lawn edges, furrower, scraper, trowel and corn cutter.

A still further object is to provide a garden tool which being adjustable, in the relative angle of the handle to the blade, makes it very versatile, beside making it adapted to be used by any person, large or small, as the handle will not be so tiring to use for tall or short people.

A still further object is to provide a tool having the angled beveled edges provided with notches or teeth the cutting faces of which are also sharpened so that the tool may be used to cut off single branches, to pick fruit and other like uses.

These objects I accomplish with the device illustrated in the accompanying drawing in which similar numerals and letters of reference indicate like parts throughout the several views and as described in the specification forming a part of this application and pointed out in the appended claim.

In the drawing,

Figure 1 is a side elevation of the top with the handle set at an acute angle thereto and the handle cut away.

Figure 2 is a plan view of Figure 1.

Figure 3 is a side elevation of the adjustment rack showing the securing lugs before they are bent at right angles for securing the rack to the blade.

Figure 4 is a plan view of the rack after the brackets have been bent.

In the drawing I have shown my hoe as made of a flat blade A, having one end thereof sharpened or beveled to a cutting blade at 5, and with the other end tapered to a curved point 6 with two slanting or angled edges 7 and 8 beveled and formed into stop cut and angled surfaces for cutting purposes, extending back from the point 6. The two sides 9 and 10 are parallel to each other and at right angles to the cutting blade 5.

Medially of the blade A, I provide a vertically extended rack 11 having teeth 12 formed therein to provide for adjustment of the control handle B. The handle B consists of two like-formed partial socket members 13 and 14 formed to grip upon two sides of a handle 15 which is carried therebetween, said handle being removably held in place by the screws or bolts 16.

The free ends of the handle socket members 13 and 14 are flattened at 17 and 18 and each is provided with an elongated longitudinal slot 19 in which slots, being opposed to each other, a slidably adjustment bolt 20 is carried. The bolt 20 is provided with a wing nut 21 for quick adjustment thereof. The extreme end of each of the handle socket members is rounded and they are pivotally attached to the rack 11 by a pivot bolt 22. This provides an adjustable handle B for the hoe as the bolt 20 may be inserted into any tooth groove of the rack as desired, and the handle locked in place by tightening the wing nut 21. The wing nut is loosened and the belt moved longitudinally of the handle in the slots 19 to permit pivoting of the handle to readjust the handle in relation to the blade A. Thus the handle may be changed relative to the blade with the least amount of work possible. In the event that even quicker changes are desired for some gardening, the bolt 20 may be provided with a spring 23 as shown in Figure 1 and may be held in place by the tension of the spring thus eliminating the need of adjusting or handling of the wing nut.

The step-like cutting edges of the slanting or angled edges 7 and 8 of the blade A are formed in forward cutting bevels 24 and backwardly slanting cutting bevels 25 so that the hoe when being used as a weeder, cuts both in the forward stroke and again when the blade is being drawn back. The edge 7 is also provided with the pruning blade which consists of a slanting beveled blade 28 and an acute angled blade 29 made adjacent the outer edge 9 with the juncture of the two beveled blades forming a sharp cutting angle for severing small branches and for cutting fruit, the blade so formed also being used when the blade is being used for cutting weeds to cut large roots and the like.

Having thus described my invention I desire to secure by Letters Patent and claim:

A garden tool comprising a blade of substantially triangular contour so that its opposed sides meet forming a point, the opposed sides of the blade having a plurality of serrations having cutting edges spaced therealong, each serration on the opposed sides of the blade comprising two edges, one edge of each serration slantingly positioned rearward and outward from the respective opposed sides of the blade and the opposed edge of each serration slantingly positioned outward and forward from the respective opposed sides of the blade, the rear side of the blade beveled to produce a cutting edge entirely across the rear, a handle, means for pivotally connecting the blade to the handle, a semi-circular rack means attached to the blade, an adjustable sliding bolt means mounted in a slot in the handle for engaging the semi-circular rack in different positions so that the blade can be adjusted in different positions with relation to the handle.

JOSEPH F. GARLAND.